United States Patent
Geleff et al.

[11] Patent Number: 5,840,230
[45] Date of Patent: *Nov. 24, 1998

[54] PROCESS FOR PREPARING HOLLOW FIBRE SECTIONS FOR HOLLOW FIBRE MODULES AND SAID HOLLOW FIBRE SECTION FOR A HOLLOW FIBRE MODULE

[76] Inventors: Svend Andreas Geleff, 13 Gejlager, Skodborg, DK-6630 Rødding; Knud Søndertoft Pedersen, 414 Ribe Landevej, DK-7100 Vejle, both of Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 737,407

[22] PCT Filed: Jun. 2, 1994

[86] PCT No.: PCT/DK94/00214

§ 371 Date: Nov. 20, 1996

§ 102(e) Date: Nov. 20, 1996

[87] PCT Pub. No.: WO95/33548

PCT Pub. Date: Dec. 14, 1995

[51] Int. Cl.⁶ .................................................. B01D 11/16
[52] U.S. Cl. ..................... 264/145; 264/159; 264/261; 264/263; 264/271.1; 210/321.8; 210/321.89; 210/500.23
[58] Field of Search ......................... 264/145, 159, 264/261, 263, 271.1; 210/321.79, 321.8, 321.81, 321.88, 321.89, 321.9, 450, 500.23

[56] References Cited

U.S. PATENT DOCUMENTS

| | | | |
|---|---|---|---|
| 3,697,635 | 10/1972 | Dietzsch | 264/135 |
| 3,704,223 | 11/1972 | Dietzsch | 210/637 |
| 4,038,190 | 7/1977 | Baudet et al. | 210/321.8 |
| 4,293,418 | 10/1981 | Fujii | 210/321.1 |
| 4,689,191 | 8/1987 | Beck | 264/261 |
| 4,769,146 | 9/1988 | Schmidt | 264/261 |
| 4,781,833 | 11/1988 | Mizutani | 219/321.81 |
| 4,840,227 | 6/1989 | Schmidt | 210/321.81 |
| 5,008,061 | 4/1991 | Bluck | 264/261 |
| 5,183,566 | 2/1993 | Darnell | 210/321.8 |
| 5,228,992 | 7/1993 | Degen | 210/321.8 |
| 5,230,796 | 7/1993 | Ter Meulen | 210/321.8 |
| 5,328,610 | 7/1994 | Rogut | 210/321.8 |
| 5,556,591 | 9/1996 | Jallerat | 210/321.8 |

FOREIGN PATENT DOCUMENTS

| | | |
|---|---|---|
| 397 638 | 11/1977 | Sweden . |
| 2 091 125 | 7/1982 | United Kingdom . |

OTHER PUBLICATIONS

Abstract of Japan Patent No. 62–160108A Jul. 1987.

*Primary Examiner*—Ernest G. Therkorn
*Attorney, Agent, or Firm*—Burns, Doane, Swecker & Mathis LLP

[57] ABSTRACT

A process for the manufacturing of hollow fiber sections for hollow fiber modules is disclosed. The process includes a casting matrix having a horizontal perforated plate, in which a number of perforations are arranged in a predetermined pattern and continuous hollow fibers are introduced through the perforations. A hardenable casting material is cast for the formation of a solid tube plate. The tube plate with embedded continuous follow fibers is raised in a vertical direction to a desired distance from the perforated plate. The tube plate is cut in the horizontal plane to expose the follow fiber ends. The steps are repeated for the formation of a hollow fiber section.

7 Claims, 1 Drawing Sheet

PROCESS FOR PREPARING HOLLOW FIBRE SECTIONS FOR HOLLOW FIBRE MODULES AND SAID HOLLOW FIBRE SECTION FOR A HOLLOW FIBRE MODULE

CROSS REFERENCE TO RELATED APPLICATION

This application is a 371 of PCT/DK94/00214 filed Jun. 2, 1994.

TECHNICAL FIELD

The present invention relates to a process for the manufacture of hollow fibre sections for hollow fibre modules and said hollow fibre section for a hollow fibre module.

BACKGROUND OF THE INVENTION

Hollow fibre modules are used in connection with exchange operations, separation operations and mixing operations. In exchange operations it is a question of both heat and mass exchange. In heat exchange heat is exchanged between two fluids of different temperature, whereby the fluid having the lower temperature obtains a higher temperature than the starting temperature. By mass exchange is in particular meant membrane processes, like dialysis (for instance an artificial kidney), direct osmosis, gas-gas-exchange and gas-fluid exchange (for instance an oxygenator). In separation processes particularly ultrafiltration, reverse osmosis and gas permeation is of interest. By mixing processes is for instance meant humidification and/or conditioning of air by admixing aqueous vapour thereto.

In the present description and claims the term "hollow fibre section" means the part of a hollow fibre module, which comprises the hollow fibres, said hollow fibres being for instance at the end provided with a plug-like means such that the fluid flowing around the fibres stays within the module.

By the term "fluid" is meant each liquid or gaseous material with such sufficient flow properties that it may pass through a hollow fibre module. By liquid is also meant solutions and suspensions of solid.

GB-A-2 091 125 discloses a process for the manufacture of a hollow fibre section, in which the individual hollow fibres are arranged in a predetermined pattern by means of at least two perforated plates, through the perforations of which the hollow fibres are guided. The perforated plates stay in the module and the hollow fibres are not connected with said perforated plates, and no casting has been done around the hollow fibres before these are cut.

Japanese publication No. 62-160.108 relates to embedment of a hollow fibre bundle in a resin and subsequent cutting of the clamped part of the bundle. The publication does not relate to guiding of the mutual arrangement of the hollow fibres, whereby the mutual arrangement of the fibres is random, and the fibres will physically adjoin each other.

Swedish published specification No. 397,638 discloses to a process for the manufacture of an apparatus for fractioning, in which process fibres are arranged in one or more ducts in a core in such a way that the duct or ducts are filled; the fibres are glued to the ends of the core, the hardened glue forming an end wall at each end of the core; the fibres are cut at the ends of the core and prior to or after the cutting of the fibres a mantle surrounding at least the duct or ducts are provided. This publication does not either relate to guiding of the mutual position of the hollow fibres, and the fibres will be in physical contact with each other.

The drawbacks of the prior art hollow fibres are among others that they are difficult to manufacture on a large scale in a simple way, i.e. with as few process steps as possible, where each individual step is carried out in a simple way, and that the mutual arrangement of the fibres is not controlled.

SUMMARY OF THE INVENTION

It is the object of the present invention to provide a process for the manufacture of a hollow fibre section for a hollow fibre module, which process may be automatized in a simple way, in order to make the manufacture of hollow fibre sections a continuous process. It is furthermore the object to provide a process, in which the mutual position of the fibres can be controlled such that the individual hollow fibre has a predetermined position relative to the nearest adjacent hollow fibres.

It has turned out surprisingly that these objects can be met by a process for the manufacture of hollow fibre modules, which is characteristic in that in a casting matrix comprising a horizontal perforated plate, in which a number of perforations are arranged in a predetermined pattern and continuous hollow fibres are conveyed through the perforations, a) a hardenable casting material is cast for the formation of a solid tube plate, b) the tube plate with the embedded continuous hollow fibres is raised in vertical direction to a desired distance from the perforated plate, c) the tube plate is cut in the horizontal plane to expose the hollow fibre ends, d) steps a, b, and c are repeated for the formation of a hollow fibre section.

The invention further relates to a hollow fibre section for hollow fibre modules, said section comprising parallelly oriented hollow fibres, which at the ends are embedded in a tube plate such that the hollow fibre ends are exposed, which section is characteristic in that the hollow fibres are arranged in a predetermined pattern.

The perforated plate used in the process according to the invention is perforated such that the perforations are arranged in a predetermined pattern. This pattern may depend on the intended use and the design of the hollow fibre module. The perforations are preferably provided in a pattern such that these perforations are spaced substantially constant relative to the nearest neighbouring perforations. The distance between the perforations may, measured from periphery to periphery of the perforations, be from 0.1–100 times the radius of the perforations, preferably from ½–2 times the radius of the perforations.

A small number of fibres is passed through each perforation, for instance less than 10 fibres per perforation, but preferably 1 hollow fibre is present per perforation.

The hollow fibres may be of any material suitable for the object of the final hollow fibre module. For heat exchange (in heat exchangers) the material may for instance be metal, glass or some other material with good heat-conducting properties. For dialysis, ultrafiltering, reverse osmosis and gas separation the fibres may consist of polymeric materials (for instance cellulose acetate, polysulphone, polyamide, etc.) and ceramic materials. The materials used for the hollow fibres may have a porous or non-porous structure, a prerequisite for mass exchange being, however, that the material used has a porous structure.

The casting matrix used is, in addition to the horizontal perforated plate, constituted by a shoulder arranged to fit tightly around the perforated plate. The object of the shoulder is to prevent the cast mass in the casting matrix from flowing out of the matrix, and the height of the shoulder is therefore at least just as big as the thickness of the tube plate formed.

The shape of the casting matrix may be any shape which is suitable for the intended use of the hollow fibre section, and the shape may for instance describe a circle, an oval, or a polygon or any other appropriate geometrical shape.

The hardenable casting mass used may be supplied to the casting matrix in any suitable way, but is preferably supplied to the casting matrix through inlets in the perforated plate. To facilitate the ability of the casting mass to detach the casting matrix, a release agent may, if desired, be applied, for instance by suitable means likewise arranged in the perforated plate.

The casting mass used may be of any suitable type which is hardenable. The casting material may for instance be melted metal or a hardenable polymeric material.

It is of importance not to damage the fibres during the embedment thereof in a tube plate, for which reason care should be taken to prevent the casting mass used during processing from destroying the fibres, for instance by melting or dissolution thereof.

The solid tube plate formed is cut horizontally, usually in such a way that the thickness of the tube plate is halved. This cutting may be performed in any suitable way, for instance by means of a saw or a hot wire, or the tube plate may be cleft with an axelike tool. It is important to cut the tool plate such that substantially all hollow fibre ends are exposed to allow a fluid to pass freely and unimpededly through the fibres.

When the hollow fibres are of a resilient material it may be advantageous to provide the hollow fibre section with supporting means during the manufacturing process to increase the mechanical strength of the hollow fibre section. Such supporting means may for instance be a through-going rigid rod connected with the tube plates.

In the manufacture of the hollow fibre section according to the invention it is intended to keep the fibres straight during the casting process, such that each fibre gets substantially the same length, whereby intimate physical contact between the fibres is avoided. This is an advantage, as in areas where the fibres are in physical contact there will be no noticeable mass or heat transport between the fluid flowing around the fibres and the fluid flowing within the fibres. It is an object to prevent the fibres in the hollow fibre section according to the invention from mutual physical contact, in such a way that by use of the final module containing the hollow fibre section, a substantially unimpeded flow in a predetermined direction relative to the fibres is attained. The unimpeded flow in a predetermined direction means that optimum exploitation of the used membrane area in a mass exchange module can be obtained.

It is thus an advantage of the method according to the present invention that the hollow fibres may be produced such that the distance between a given fibre and the nearest neighbouring fibres is substantially constant, as it is thereby possible to attain a substantially uniform flow in a predetermined direction relative to all fibres, and consequently a uniform treatment of the fluid flow through different fibres and optimum exploitation of the whole membrane area used for a mass exchange module. The same view applies for heat exchange, as the whole contact area between the fluid to be heated and the fluid to be cooled, respectively, is utilized optimally.

It should be noted that the casting if desired may take place simultaneously with the cutting of a previously formed tube plate or that the casting of a new tube plate may take place prior to the cutting of the preceding tube plate formed.

The hollow fibre section manufactured by the process according to the invention is provided with a mantle fitting tightly to the periphery of the cut tube plates formed, said mantle being provided with means for inlet and outlet of fluid. The ends are provided with end pieces with means for inlet and outlet, respectively, of fluid. To make the mantle fit tightly to the tube plates, it may be necessary to solder, weld or use glue to fasten the mantle to the tube plates.

If desired, the mantle may be fastened to the tube plates as a part of the continuous process in the manufacture of hollow fibre modules. After the cutting of the tube plate, the hollow fibre section can be introduced into a cylinder with a clear corresponding to the tube plate and a length corresponding to that of the hollow fibres, following which the tube plates may be fastened to the cylinder by soldering, welding or glueing.

It may be advantageous to provide the hollow fibre module with interior flow-changing means to control the fluid flowing around the fibres in order to attain the desired flow pattern.

Flow-changing means may be provided in any desired way, for instance by

A) dividing the perforated plate in sections which are vertically displaceable relative to each other in such a way that the cast plate gets the desired shape, and in such a way that both tube plate and flow-changing means may be cast around the fibres. When casting is made in part of the casting matrix it is delimited by the part of the shoulder, in which the section or the sections of the perforated plates are lowered relative to the remaining ones, by the vertical delimitations of the not lowered perforated plates against the lowered perforated plates and by the hollow fibres. When the casting mass is hardened, the flow-changing means is raised a predetermined distance, following which it is possible to change the pattern of the section of perforated plates and to form a new casting matrix, in which renewed casting may take place. After the casting of a desired number of flow-changing means, the casting of a complete tube plate is made.

B) providing displaceabe or insertable shoulders in the perforated plate for the formation of restricted areas, in which individual casting may be performed. When the casting made thereby is raised a distance corresponding at least to the height of the casting, and the displaceable shoulders are lowered, whereas other shoulders are raised, and a new casting is performed, a flow-changing means will be provided with an extension corresponding to a part of the tube plate.

C) embedding rigid plates into the tube plate, while still liquid.

BRIEF DESCRIPTION OF THE DRAWINGS

The invention will be explained in detail with reference to the drawing, in which.

DETAILED DESCRIPTION OF THE PREFERRED EMBODIMENTS

Figure 1:
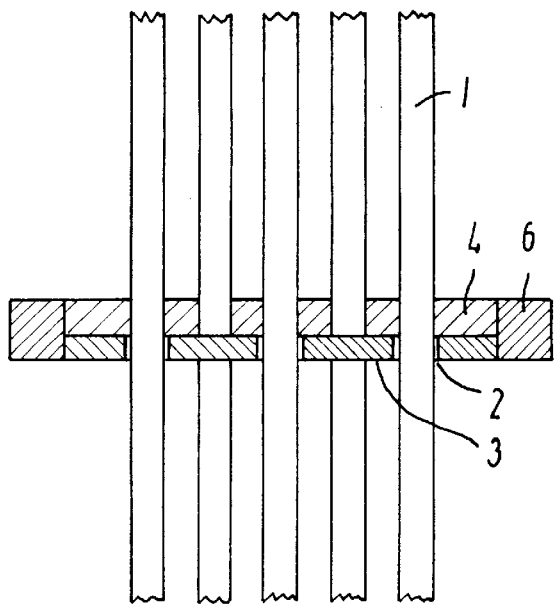
FIG. 1 is a sectional view through the casting matrix, in which the tube plate is cast.

FIG. 1 shows endless hollow fibres (1) passed through a number of perforations (2) in a horizontal perforated plate (3). A shoulder (6) is mounted around the perforated plate, said shoulder having edges extending upwards relative to the perforated plate. The perforated plate (3) and the shoulder (6) constitute a casting matrix. A hardenable casting mass is introduced into the casting matrix. The hardened casting mass constitutes a tube plate (4) enclosing the fibres. The casting mass has been introduced into the casting matrix by means not shown for inlet thereof.

Figure 2:
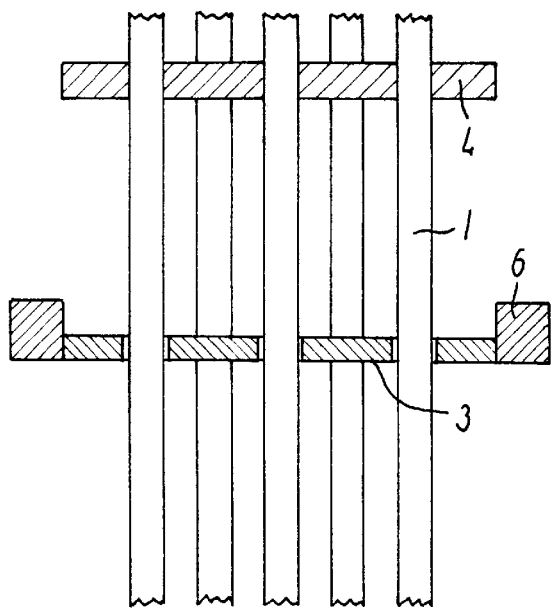
FIG. 2 shows the tube plate raised to a desired distance from the perforated plate.

In FIG. 2 the tube plate (4) with the embedded endless hollow fibres has been raised vertically to a desired distance from the perforated plate (3) by means of a device not shown, which provides the necessary rise by pulling either the fibres or the tube plate.

Figure 3:
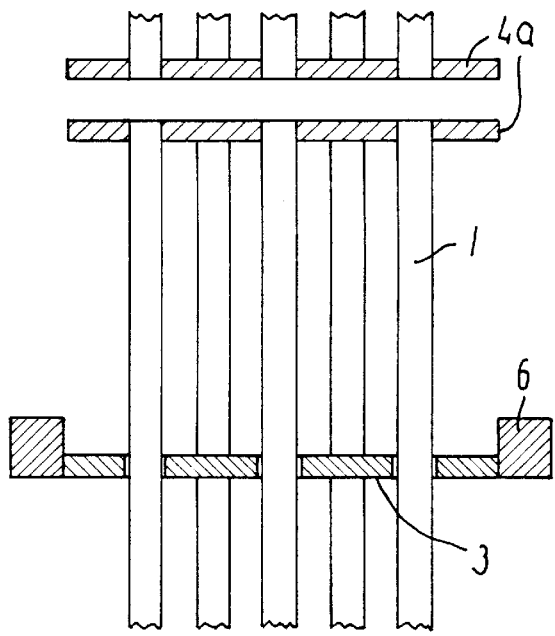
FIG. 3 shows the tube plate cut into two parts.
Figure 4:
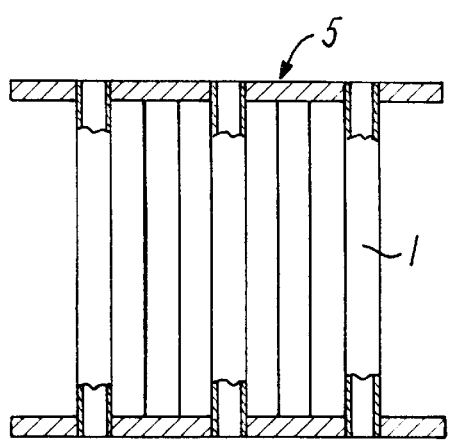
FIG. 4 is a lateral sectional view of the final hollow fibre section.
Figure 5:
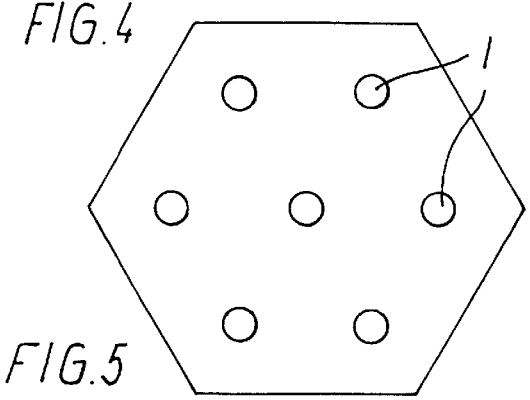
FIG. 5 shows the final hollow fibre section from above.

In FIG. 3 the tube plate is cut horizontally for the formation of two intersected tube plates (4a), the fibre ends being thereby exposed. By repeating the casting shown in FIG. 1, the rise shown in FIG. 2 and the cutting shown in FIG. 3, a fibre section (5) shown in FIGS. 4 and 5 is formed. FIG. 4 is a lateral view of the section is shown, and in FIG. 5 the section is seen from above.

The hollow fibre section shown in FIG. 5 has seven fibres placed such that each individual fibre has a substantially constant distance to the nearest neighbouring fibres. It is apparent that the invention can be used in respect of an arbitrary number of fibres and an arbitrary mutual positioning of the fibres.

If desired, several hollow fibre sections may be put together and surrounded by a common mantle for the formation of a final module containing several hollow fibre sections.

The process according to the invention may be automatized in a simple way, the manufacture of the hollow fibre sections being feasible quickly and effectively in some few and simple steps without any time-consuming working operations.

We claim:

1. A process for the manufacture of hollow fibre sections for hollow fibre modules, said process comprising the steps of:

a) providing a casting matrix comprising a shoulder and a horizontal perforated plate in which a number of perforations are arranged in a predetermined pattern, b) conveying a plurality of continuous hollow fibres through the perforations, c) casting a hardenable casting material in the casting matrix for the formation of a solid tube plate, d) raising the tube plate with the embedded continuous hollow fibres in a vertical direction to a desired distance from the perforated plate, e) cutting the tube plate in the horizontal plane to expose the hollow fibre ends and form a first tube plate and a second tube plate, f) repeating steps c, d, and e to form a third tube plate and a fourth tube plate, the second tube plate and the third tube plate defining an upper tube plate and a lower tube plate for the formation of a hollow fibre section.

2. A process according to claim 1, characterized in that each perforation is provided in the pattern such that the perforation is substantially constantly spaced from the nearest neighbouring perforations.

3. A process according to claim 1, characterized in that the spacing between the perforations, measured from their peripheries, is from 0.1–100 times the radius of the perforations.

4. A process according to claim 1, characterized in that the casting matrix is constituted by the horizontal, perforated plate and a shoulder around said perforated plate, the shoulder having edges extending upwards relative to the perforated plate.

5. A process according to claim 1, characterized in that the perforated plate is provided with means for supplying release agent and casting material.

6. A process according to claim 1, characterized in that the spacing between the perforations, measured from their peripheries, is from ½–2 times the radius of the perforations.

7. A process according to claim 1, characterized in that steps (a), (b), and (c) are automatized in a continuous process.

\* \* \* \* \*